July 15, 1952 — A. H. LAMB — 2,603,091
BIMETALLIC THERMOMETER FOR USE IN THE DAIRY INDUSTRY
Filed May 16, 1949
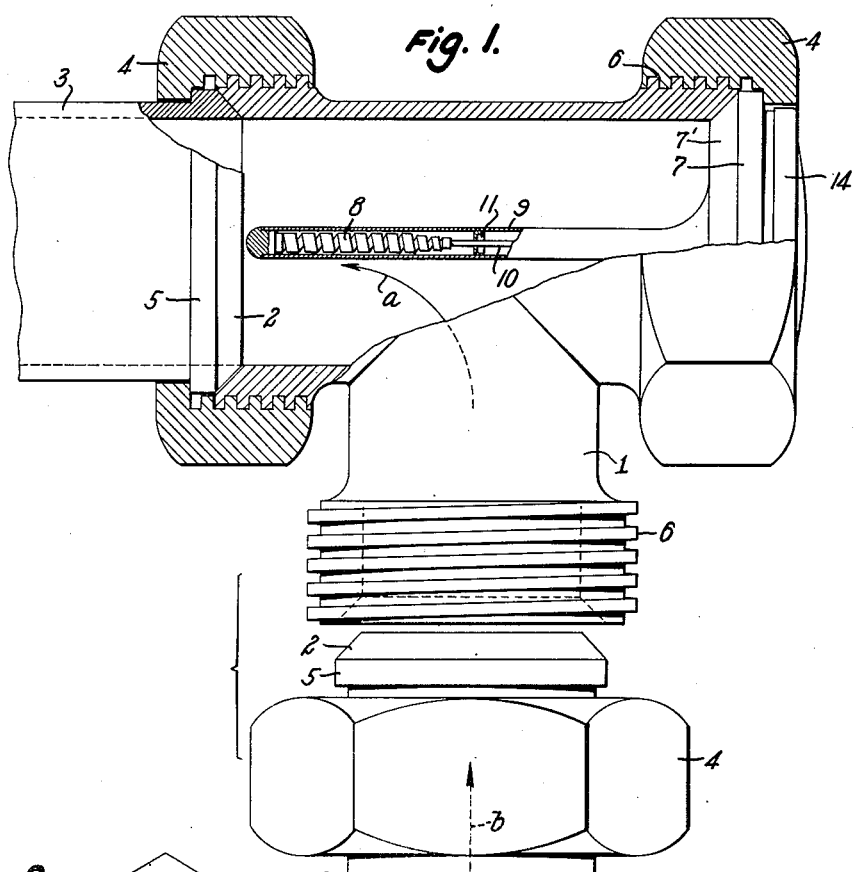
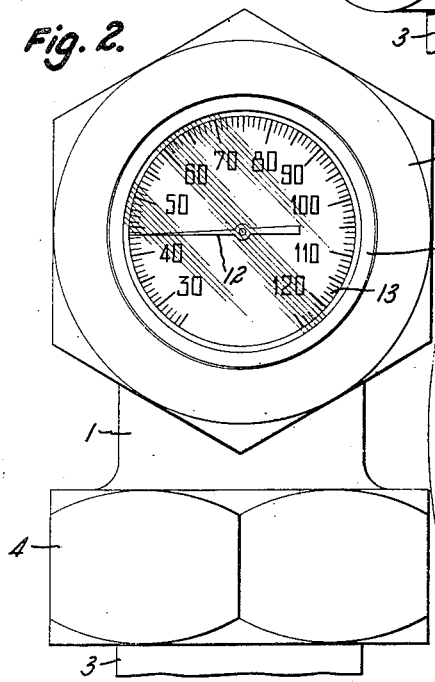
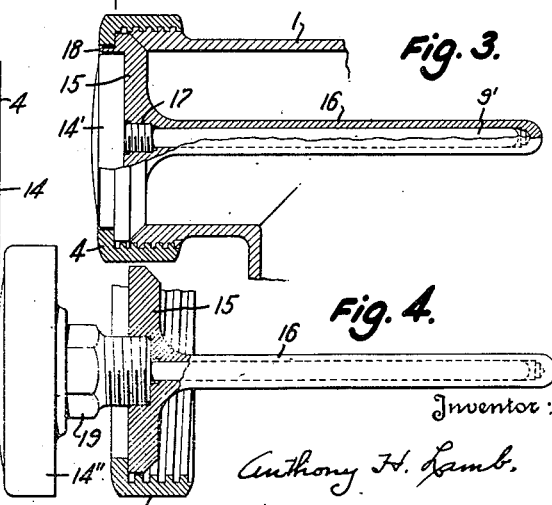
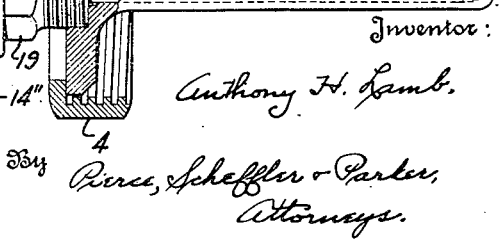
Inventor: Anthony H. Lamb
By Pierce, Scheffler & Parker, Attorneys.

UNITED STATES PATENT OFFICE 2,603,091

BIMETALLIC THERMOMETER FOR USE IN THE DAIRY INDUSTRY

Anthony H. Lamb, Hillside, N. J., assignor to Weston Electrical Instrument Corporation, Newark, N. J., a corporation of New Jersey Application May 16, 1949, Serial No. 93,564

3 Claims. (Cl. 73—343)

This invention relates to bimetallic thermometers for use in the dairy industry, and particularly to bimetallic thermometers for installation on the so-called bevel joint fittings of dairy pipe lines and which satisfy the customary State and Federal sanitary regulations for the dairy industry.

The sanitary regulations are quite rigid and require, for example, that the interior surfaces of all piping be thoroughly cleaned every twenty-four hours, that the surfaces contacted by the milk be polished, and that the pipe joints be free from cracks or recesses into which the milk may flow or settle. Non-metallic packing can not be used to ensure tight joints in the pipes, and the standard "bevel joint fittings" of the industry are compression couplings with mating surfaces beveled at 45° and ground to form leakproof joints.

Objects of the present invention are to provide bimetallic thermometers and mountings therefor which meet the customary sanitary requirements for use in the dairy industry. An object is to provide bimetallic thermometers, or sockets for receiving bimetallic thermometers, which may be mounted in bevel joint fittings as used in the dairy industry. More specifically, an object is to provide bimetallic thermometers, or sockets for receiving bimetallic thermometers, having highly polished, stainless steel surfaces for contact with milk flowing through the pipe lines of a dairy or milk-processing plant, and with polished beveled flanges for leakproof sealing upon the flanges of bevel joint fittings.

These and other objects and the advantages of the invention will be apparent from the following specification when taken with the accompanying drawings, in which:

Fig. 1 is an elevation, with parts in section, of a thermometer embodying the invention and mounted in a bevel flange fitting;

Fig. 2 is an end elevation of the same;

Fig. 3 is a central section through a part of a pipe fitting and a sanitary thermometer socket embodying the invention, a thermometer being shown within the socket; and Fig. 4 is a side elevation, with parts in section, of a thermometer socket, a large dial thermometer, and a fitting nut as seen when removed from the pipe fitting.

In Figs. 1 and 2 of the drawings, the reference numeral 1 identifies a conventional bevel joint T-fitting of stainless steel such as used in the dairy industry. The inner walls of the fitting are smooth and highly polished, and the ends of the passages are beveled at an angle of 45° to form seats against which the correspondingly beveled ends 2 of pipes 3 may be drawn by gland nuts 4 with internal flanges which engage collars 5 on the pipes. The threads 6 of the fitting and nuts are square machine threads of relatively wide pitch to facilitate dis-assembly of the piping for daily cleaning, and subsequent reassembly. The cooperating beveled surfaces of the fitting and the pipes are smoothly and accurately ground to insure leakproof joints. The milk under treatment may flow through the pipe system in the direction indicated by the arrows $a$, $b$ and, if the fitting were not provided with a thermometer embodying the invention, another pipe or a plug with a beveled seat would be secured to the right end of the fitting by a gland nut 4.

A bimetallic thermometer according to the invention has a heavy and rigid mounting flange 7 with a beveled inner edge portion 7' which extends to the periphery of the flange and which is forced into leakproof engagement with the beveled seat on the pipe fitting by a gland nut 4. The helical bimetallic element 8 of the thermometer is located within the inner end of an elongated hollow stem 9 which merges smoothly into the inner face of the flange 7, and the ends of the bimetallic element are secured, respectively, to the stem and to a staff 10 which is loosely guided for rotation by ring bearings 11 fixed within the stem. A pointer 12 is secured to the outer end of the staff 10 in front of a graduated scale plate 13 located in the indicator head or casing 14 which extends forwardly from the mounting flange 7. The casing is protected against damage except for substantially axial blows since it is within the shallow cylindrical recess formed by the flange of the gland nut 4.

The surfaces of the mounting flange 7 and of the hollow stem 9 are stainless and highly polished to facilitate cleaning and sterilization, and inspection after cleaning. The flange and stem are preferably of stainless steel, and they may be integral and turned from cylindrical bar stock or from a casting. Other methods of assembly may be employed as, for example the flange and stem may be separately formed, either to exact or approximate sizes, welded, and the welded joint ground smooth. Drop forging processes may be employed to form the flange and stem assembly, or parts thereof which are then welded to each other. The particular method of forming the flange and stem assembly is not an essential feature of the invention but a one-piece construction machined from bar stock or a casting is presently preferred.

The surface of the stem 9 and the inner face of the flange 7 which is contacted by the milk are ground and polished to a so-called "#4 Dairy Finish," or better, to satisfy the customary sanitary regulations of the dairy and milk-processing industries.

An alternative construction which permits use of commercially available bimetallic thermometers is illustrated in Figs. 3 and 4. As shown in Fig. 3, a socket for mounting a conventional thermometer in a pipe fitting includes a beveled flange 15 for seating upon the beveled outer end of a passage through a fitting 1, and a tubular section 16 with a closed inner end. The flange 15 is counterbored and provided with threads 17 for receiving the threaded mounting head of a thermometer having a stem 9' which extends snugly into the tubular section 16 of the socket. The outer face of the flange 15 of the socket may be provided with a short cylindrical flange 18 within which the casing 14' of a thermometer may seat when the pipe fitting is so located that it is practical to employ a thermometer with a relatively small diameter casing and scale plate.

The socket is formed of stainless steel, and preferably as a one-piece assembly of mounting flange 15 and tubular section 16 although these parts may be separately formed, either completely or in part, and united by welding. The surfaces which contact the milk are smoothly ground and polished, and the tubular section is flared at its outer end to merge smoothly into the inner face of the flange 15. The bevel surface of the flange is of course finished to form a leakproof joint with the complementary beveled surface of the pipe fitting.

When the pipe fitting is at some distance above floor level or is otherwise so located that the thermometer must be read from a distance, a thermometer casing 14" of large diameter must be provided to house a large diameter graduated scale, see Fig. 4. The thermometer casing may be as large as, or larger than, the gland nut 4 which secures the thermometer socket 15, 16 to the pipe fitting. The mounting head 19 of the thermometer is of such axial length as to allow freedom of movement of the gland nut 4 which is to be threaded upon the pipe fitting to provide a leakproof joint between the socket flange 15 and the fitting.

It is to be understood that the invention is not limited to the particular embodiments herein shown and described since various modifications fall within the spirit and scope of the invention as set forth in the following claims.

I claim:

1. A bimetallic thermometer for mounting in a bevel joint pipe fitting by means including a gland nut having an inturned clamping flange, said thermometer including a rigid mounting flange with a beveled surface for seating upon a bevel joint surface of a pipe fitting, said beveled surface extending to the periphery of the mounting flange, a tubular section having an outer end flaring smoothly into the inner face of the mounting flange, the inner end of said tubular section being closed, a helical bimetallic element within the inner end of said tubular section, a staff secured to said bimetallic element and projecting outwardly through said mounting flange, an indicator casing into which said staff extends, a graduated scale within said casing, and a pointer carried by said staff for cooperation with said scale; said indicator casing having a diameter and axial length to seat within the shallow cylindrical recess defined by the inturned clamping flange of a gland nut.

2. A bimetallic thermometer as recited in claim 1, wherein said mounting flange and tubular section constitute a socket, said flange is counterbored and threaded in alinement with the bore of the tubular section, said casing is provided with a threaded mounting head for reception in the threaded counterbore of the mounting flange, and a hollow stem is secured to said mounting head to enclose and support said bimetallic element; said casing, mounting head and stem constituting, with the parts carried thereby, a unitary thermometer assembly for mounting in said socket.

3. A socket for mounting a bimetallic thermometer in a bevel joint fitting as employed in the dairy industry, the thermometer including a cylindrical indicator casing carried by a threaded mounting head; said socket comprising a mounting flange with a beveled surface for seating upon a bevel joint inner surface of a pipe fitting, a tubular section having a closed inner end and an outer end flaring smoothly into the inner face of said beveled flange, and said flange being counterbored to provide a housing for the indicator casing and threaded to receive the threaded mounting head of a thermometer.

ANTHONY H. LAMB.

REFERENCES CITED

The following references are of record in the file of this patent:

UNITED STATES PATENTS

| Number | Name | Date |
|---|---|---|
| 1,233,385 | Maurer | July 17, 1917 |
| 1,609,606 | Clawson | Dec. 7, 1926 |
| 1,890,006 | Swift | Dec. 6, 1932 |
| 2,178,697 | Oestreicher | Nov. 7, 1939 |
| 2,244,798 | Olson | June 10, 1941 |
| 2,276,178 | Ford | Mar. 10, 1942 |

FOREIGN PATENTS

| Number | Country | Date |
|---|---|---|
| 559,288 | Great Britain | Feb. 11, 1944 |